May 9, 1961  R. J. GROSS  2,983,007
REEFING RING FOR PARACHUTES
Filed April 11, 1958
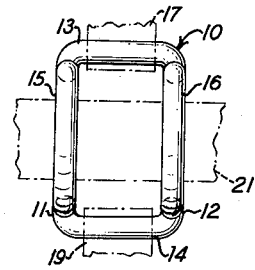
Fig. 1
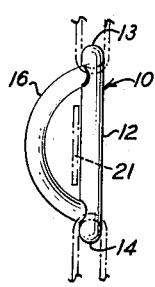
Fig. 2
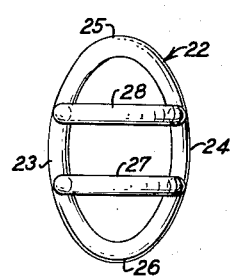
Fig. 3
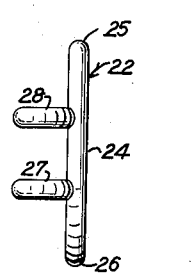
Fig. 4
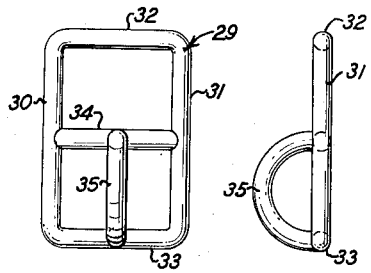
Fig. 5  Fig. 6
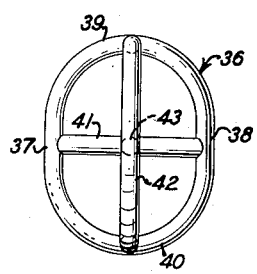
Fig. 7
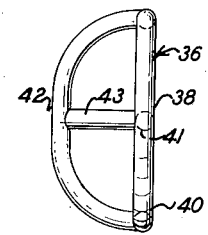
Fig. 8
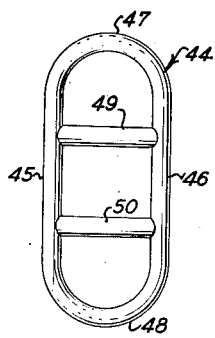
Fig. 9  Fig. 10
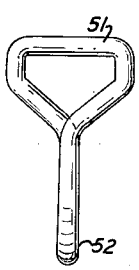
Fig. 11
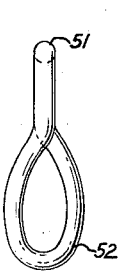
Fig. 12
INVENTOR
REINHOLD J. GROSS
BY *Jacobi & Jacobi*
ATTORNEYS

United States Patent Office 2,983,007
Patented May 9, 1961

2,983,007
REEFING RING FOR PARACHUTES
Reinhold John Gross, Dayton, Ohio, assignor to M. Steinthal & Co., Inc., New York, N.Y., a corporation of New York Filed Apr. 11, 1958, Ser. No. 727,859
3 Claims. (Cl. 24—73)

This invention relates to aeronautics and more particularly to accessories which may be utilized with parachutes for accommodating a reefing line to permit restricting the diameter of the parachute when inflated.

Heretofore, it has been common practice in certain instances to restrict the diameter of a parachute when inflated for the purpose of reducing the initial shock force during deployment, to achieve a fast rate of fall during the initial period of descent and to improve the stability characteristics of the parachute, as well as for numerous other purposes. In order to accomplish this result, a reefing line has been positioned around the skirt of the canopy, which line serves to restrict the diameter of the parachute when inflated. These reefing lines may be of a fixed length which in turn will fix the diameter of the parachute or may be adjustable in order to change the diameter of the parachute from maximum to a desired minimum, which change may be accomplished prior to inflation or which may be accomplished during the descent of the parachute in order to change the characteristics thereof. It has been common practice heretofore to secure rings to the radial tapes of the parachute canopy and to pass the reefing line through these rings, but such rings have only been available in a single configuration or design and in many instances, the same are not suited to the particular parachute structure and reefing line arrangement to be employed. It, therefore, appears desirable to provide a variety of different types and configurations of reefing rings in order to accommodate all types of parachute and reefing line designs.

It is accordingly an object of this invention to provide a reefing ring for parachutes which may be conveniently attached thereto during manufacture thereby eliminating the necessity for attaching such rings by manual operations subsequent to the manufacture of the parachute.

A further object of the invention is the provision of a reefing ring for parachutes which may conveniently serve as a connecting means between the radial tapes of the parachute canopy and the shroud lines and at the same time, provide a ring for receiving a reefing line in a manner to eliminate friction between such line and the radial tapes or shroud lines.

A still further object of the invention is the provision of a reefing for parachutes which may be conveniently attached to the radial tapes or shroud lines and which will serve to accommodate one or more reefing lines in a manner to prevent fouling of such lines, one with the other, or with the shroud lines or radial tapes of the parachute.

Another object of the invention is the provision of a reefing ring for parachutes which may be attached thereto in such a manner as to provide for free passage of a reefing line therethrough, thereby reducing friction between the line and the ring to a minimum.

A further object of the invention is the provision of a reefing ring for parachutes which may be conveniently attached to the radial tapes of the canopy of the parachute at any desired point between the skirt and the vent opening, such attachment being accomplished without modifying the structure of the parachute or requiring alteration thereof.

A still further object of the invention is the provision of a reefing ring for parachutes which may be permanently attached to the skirt of the canopy and which is formed in such a manner as to prevent fouling between the various rings which might conceivably prevent proper inflation of the parachute canopy.

Further objects and advantages of the invention will be apparent from the following description taken in conjunction with the accompanying drawing wherein:

Fig. 1 is a front elevational view of one form of reefing ring constructed in accordance with this invention and showing in dotted lines the manner of attaching the radial tapes and shroud lines to the ring, as well as the way in which the reefing line passes through the ring;

Fig. 2 a side elevational view of the reefing ring shown in Fig. 1;

Fig. 3 a front elevation of a slightly modified form of reefing ring designed to accommodate a plurality of reefing lines;

Fig. 4 a side elevational view of the reefing ring shown in Fig. 3;

Fig. 5 a front elevational view of a still further modified form of reefing ring constructed in accordance with this invention and designed to accommodate a reefing line with a minimum of friction;

Fig. 6 a side elevational view of the reefing ring shown in Fig. 5;

Fig. 7 a front elevational view of a further modified form of the invention and showing a reefing ring designed to accommodate a plurality of reefing lines with a minimum of friction and preventing fouling between such lines;

Fig. 8 a side elevational view of reefing ring shown in Fig. 7;

Fig. 9 a front elevational view of a still further modified form of reefing ring constructed in accordance with this invention and designed to substantially eliminate reefing line friction;

Fig. 10 a side elevational view of the reefing ring shown in Fig. 9;

Fig. 11 a front elevational view of yet another modified form of reefing ring which may be conveniently attached to the radial tapes of a parachute canopy at any point between the skirt and the vent opening of such canopy; and Fig. 12 a side elevational view of the reefing ring shown in Fig. 11.

With continued reference to the drawing, there is shown in Figs. 1 and 2 a reefing ring constructed in accordance with this invention and which may well comprise a flat generally rectangular frame 10 composed of spaced sidebars 11 and 12 and relatively shorter spaced end bars 13 and 14. A semi-circular loop 15 may be fixed to the sidebar 11 and a second semi-circular loop 16 may be fixed to the sidebar 12. The loops 15 and 16 extend at substantially right angles to the plane of the frame 10, as clearly shown in Figs. 1 and 2.

The reefing ring shown in Figs. 1 and 2 and described above may be conveniently incorporated in a parachute during manufacture thereof and the radial tapes 17 of the parachute may be looped about the end bars 13 of the frame 10 of each reefing ring, and each shroud line 19 may be looped about the end bar 14 of the frame 10 and secured thereto in order to provide a connecting means between the tapes 17 and shroud lines 19.

The semi-circular loops 15 and 16 are directed inwardly of the parachute canopy and a reefing line 21 freely extends through the loops 15 and 16 and depending upon the length of the reefing line 21, this will serve to restrict the diameter of the parachute canopy when inflated. As mentioned above, the reefing line 21 may be of a fixed length which will then, of course, determine the maximum diameter of the canopy when inflated or the reefing line 21 may be of a type to be pulled through the loops 15 and 16 thereby changing the diameter of the canopy as desired. Obviously, the reefing ring, as above described, may be incorporated in the parachute during manufacture and may thereafter be utilized for receiving a reefing line or the reefing line may be omitted without in any way interfering with the normal operation of the parachute.

A modified form of the invention is shown in Figs. 3 and 4 and may well comprise a reefing ring composed of a flat generally elliptical frame 22 having spaced curved sidebars 23 and 24 and relatively shorter spaced curved end bars 25 and 26. A pair of spaced substantially semi-circular loops 27 and 28 extend between the sidebars 23 and 24 and are attached thereto in such a manner as to be disposed at substantially right angles to the plane of the frame 22.

In the use of this form of the invention, the radial tapes of the parachute are attached to the end bar 25 and the shroud lines to the end bar 26, while one or more reefing lines may be freely run through the loops 27 and 28. By disposing the frame 22 at an angle, one reefing line may pass through the loop 27 and another reefing line through the loop 28 in such a manner as to eliminate interference or fouling therebetween. Such reefing lines will, of course, serve to restrict the diameter of the parachute canopy when inflated, in the same manner as described above, in connection with the first form of the invention.

A still further modified form of the invention is shown in Figs. 5 and 6 in which there is provided a flat generally rectangular frame 29 composed of spaced sidebars 30 and 31 and relatively shorter spaced end bars 32 and 33. A cross bar 34 is connected between the sidebars 30 and 31 substantially midway of the length thereof and a substantially semi-circular loop 35 is fixed to the cross bar 34 and the end bar 33 substantially midway between the sidebars 30 and 31 and the loop 35 extends at substantially right angles to the plane of the frame 20.

In utilizing the form of reefing rings shown in Figs. 5 and 6, the radial tapes and shroud lines of a parachute are secured to the end bars 32 and 33 of the frame 29 and a reefing line passes freely through the semi-circular loop 35 which is directed inwardly of the parachute and, as described above, such reefing line serves to restrict the diameter of the parachute canopy when inflated.

Another modfied form of reefing ring constructed in accordance with this invention is shown in Figs. 7 and 8 and comprises a flat oval frame 36 composed of straight sidebars 37 and 38 and spaced curved end bars 39 and 40. A substantially semi-circular loop 41 extends between the sidebars 37 and 38 midway of the length thereof and the loop 41 is disposed substantially at right angles to the plane of the frame 36. A second substantially semi-circular loop 42 extends between the end bars 39 and 40 at substantially right angles to the plane of the frame 36 and the loop 42 is secured to the first loop 41 at a point 43 where the two loops intersect.

The reefing ring shown in Figs. 7 and 8 and described above is secured to the radial tapes and shroud lines of a parachute in substantially the same manner as the other forms of the invention described above with the loops 41 and 42 directed inwardly of the parachute and by this structure there is provided a means whereby a plurality of reefing lines may freely pass through the appropriate portions of the loops 41 and 42 in such a manner as to prevent friction therebetween and also in such a manner as to prevent fouling of the reefing lines with each other or with the shroud lines of the parachute. Such reefing lines will serve to restrict the diameter of the parachute canopy when inflated in the manner described above.

A still further modified form of the invention is shown in Figs. 9 and 10 and may comprise a flat elongated frame 44 composed of spaced straight sidebars 45 and 46 and relatively shorter spaced curved endbars 47 and 48 and a pair of spaced parallel cross bars 49 and 50 extend between the sidebars 45 and 46 in spaced relation to each other and to the end bars 47 and 48.

The radial tapes and shroud lines of a parachute are secured to the end bars 47 and 48 and a reefing line may freely pass through the space between the cross bars 49 and 50 with the reefing lines serving to restrict the diameter of the parachute canopy when inflated, as described above.

A further modified form of reefing ring designed for a particular application is shown in Figs. 11 and 12 and may comprise a single closed rod formed to provide a generally rectangular bail portion 51 and a loop 52 with the plane of the loop disposed at substantially right angles to the plane of the bail portion 51.

The form of reefing ring shown in Figs. 11 and 12 may be applied to the canopy of a parachute at any point between the skirt and vent opening thereof and for this purpose the bail portion 51 is secured to the radial tape of the parachute canopy at any desired location between the skirt of the canopy and the vent opening and the bail portion 51 is secured to the radial tape by a length of webbing or other suitable material extending through the bail portion 51 and secured to the radial tape by sewing or in any other suitable manner. In this way, the reefing ring shown in Figs. 11 and 12 may be attached to a parachute without in any way modifying the structure thereof and at any desired location in order to accomplish the desired results and, of course, the ring will be applied with the loop portion 52 directed inwardly of the parachute to freely receive a reefing line for restricting the diameter of the parachute canopy when inflated.

It will be seen that by the above described invention, there has been provided numerous types and forms of reefing rings for parachutes which may be conveniently installed therein during manufacture or at any time thereafter and which rings serve to accommodate one or more reefing lines in order to accomplish the desired reefing of the parachute in order to restrict the diameter thereof when inflated. Many of the reefing rings, above described, also serve as a connecting link between the canopy tapes and the shroud lines and it will also be seen that in the event a reefing line is not desired, that the presence of the reefing rings will in no way interfere with the normal inflation and operation of the parachute.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A reefing ring for parachutes comprising a flat generally rectangular frame composed of spaced sidebars and relatively shorter spaced end bars and a substantially semi-circular loop fixed to each sidebar and extending at substantially right angles to the plane of said frame and lying in the plane of each sidebar, whereby the radial tapes of a parachute may be secured to one end bar of a plurality of rings and the shroud lines to the other end bar of said rings with said loops directed inwardly of said parachute to freely receive a reefing line for restricting the diameter of the parachute when inflated.

2. A reefing ring for parachutes comprising a flat generally rectangular frame composed of spaced sidebars and relatively shorter spaced end bars and a loop fixed to each sidebar and extending at substantially right angles to the plane of said frame and lying in the plane of each sidebar, whereby the radial tapes of the parachute may be secured to one end bar of a plurality of rings and the shroud lines to the other end bar of said rings with said loops directed inwardly of said parachute to freely receive a reefing line for restricting the diameter of the parachute when inflated.

3. A reefing ring for parachutes comprising a flat generally rectangular frame composed of spaced sidebars and relatively shorter spaced end bars and a loop fixed to each sidebar and extending at substantially right angles to the plane of said frame and lying in the plane of each sidebar, whereby the radial tapes and shroud lines of a parachute may be secured to the frames of a plurality of rings with said loops directed inwardly of said parachute to freely receive a reefing line for restricting the diameter of the parachute when inflated.

References Cited in the file of this patent

UNITED STATES PATENTS

| | | |
|---|---|---|
| 249,597 | Droll | Nov. 15, 1881 |
| 368,583 | Hayden | Aug. 23, 1887 |
| 370,814 | Pearsall | Oct. 4, 1887 |
| 761,038 | Edgerton | May 24, 1904 |
| 1,230,397 | Favel | June 19, 1917 |
| 1,243,232 | Taggart | Oct. 16, 1917 |
| 1,825,016 | Salisbury | Sept. 29, 1931 |

FOREIGN PATENTS

| | | |
|---|---|---|
| 535,156 | France | 1922 |